3,030,354
NEW DISAZO-DYESTUFFS INSOLUBLE
IN WATER
Joachim Ribka, Offenbach (Main), Germany, assignor to Farbwerke Hoechst Aktiengesellschaft vormals Meister Lucius & Brüning, Frankfurt am Main, Germany, a corporation of Germany
No Drawing. Filed Mar. 1, 1960, Ser. No. 11,977
Claims priority, application Germany Mar. 4, 1959
6 Claims. (Cl. 260—176)

The present invention relates to new disazo-dyestuffs insoluble in water and to a process for preparing the same; more particularly it relates to dyestuffs corresponding to the following general formula

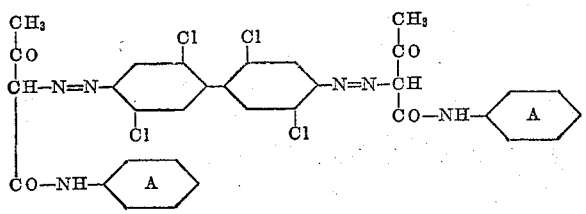

wherein the benzene nuclei A may be substituted by alkyl or alkoxy groups of low molecular weight, halogen atoms or acylamino groups provided that 2,4-dimethylbenzene is excluded.

In U.S. patent application Serial No. 811,009, now Patent No. 2,984,660, filed May 5, 1959, in the name of Joachim Ribka is disclosed a process for the manufacture of a disazo-dyestuff insoluble in water wherein the tetrazonium compound of 4,4'-diamino-2,2',5,5'-tetrachlorodiphenyl is coupled in substance, on the fiber or on another substratum with 1-acetoacetylamino-2,4-dimethylbenzene.

According to this process a valuable dyestuff is obtained which is distinguished by good properties of fastness and is particularly suitable for coloring plastic masses, for graphic printing and for specialized technical uses in the lacquer, wall paper and paper industries.

Now, we have found that dyestuffs of similar good properties of fastness are obtained by using in the process according to U.S. patent application Serial No. 811,009 instead of 1-acetoacetylamino-2,4-dimethylbenzene other acetoacetylamino compounds of the benzene series.

In the process of the present invention there may be used—with the exception of the 1-acetoacetylamino-2,4-dimethylbenzene—any other acetoacetylamino compounds of the benzene series in which the benzene nucleus contains one or more substituents which do not impart solubility in water such, for example, as alkyl or alkoxy groups of low molecular weight and/or halogen atoms and/or acylamino groups.

The new dyestuffs yield on vegetable fibers and on fibers of regenerated cellulose by known dyeing and printing methods valuable yellow dyeings and prints.

The dyestuffs prepared in substance are yellow pigments insoluble in water. These pigments have good properties of fastness to solvents and light, and, therefore, they are particularly suitable for coloring plastic masses, for pigment printing and for specialized technical uses in the lacquer, wall paper and paper industries.

The new dyestuffs can also be applied to textile materials by padding or pigment printing or they may be used for coloring natural or synthetic resins.

The following examples serve to illustrate the invention but they are not intended to limit it thereto, the parts being by weight.

Example 1

32.2 parts of 4,4'-diamino-2,2',5,5'-tetrachlorodiphenyl are tetrazotized in the usual manner. The tetrazo-solution thus obtained is coupled in known manner with 50 parts of 1-acetoacetylamino-2-methyl-4-acetylaminobenzene in acetic acid suspension, which suspension is prepared with the aid of a reaction product of about 20 mols of ethylene oxide with 1 mol of oleyl alcohol.

After completion of the dyestuff formation the dyestuff is filtered with suction, washed and dried. The dyestuff is obtained in the form of a yellow powder.

The coupling may also be carried out in the presence of a substratum adapted for the preparation of color lakes.

Example 2

Cotton fabric is padded on the foulard with the following solution and dried:

20 grams of 1-acetoacetylamino-2,5-dimethoxy-4-chlorobenzene are pasted with 30 cc. of Monopol Brilliant Oil and 14 cc. of sodium hydroxide solution of 38° Bé., the whole is dissolved by the addition of 500 cc. of hot water and made up to 1 liter with cold water.

The dried fabric is developed on the foulard with the following solution:

10 grams of 4,4'-diamino-2,2',5,5'-tetrachlorodiphenyl are pasted with 0.5 gram of a reaction product from about 20 mols of ethylene oxide and 1 mol of octadecyl alcohol, 24 cc. of hydrochloric acid of 20° Bé. and 50 cc. of cold water and the whole is dissolved by the addition of water. 4.8 grams of sodium nitrite, dissolved in 24 cc. of water, are then added together with ice while stirring well.

The tetrazo-solution thus obtained is introduced into a bath containing 2 grams of a reaction product from about 20 mols of ethylene oxide and 1 mol octadecyl alcohol, 20 cc. of acetic acid of 50% strength and 30 grams of sodium acetate. The solution is then made up to 1 liter with cold water. After having passed air through the fabric for about 30 seconds, the coupling is completed by passing the material through hot water. The material is then rinsed, soaped for 15 minutes at 95° C. with a solution containing per liter of water 1 gram of a reaction product from about 10 mols of ethylene oxide and 1 mol of isododecylphenol, and 3 grams of sodium carbonate, rinsed and dried.

A yellow dyeing of good fastness to light is obtained.

The following table indicates a number of further coupling components which can be used with the same diazo component, and also the tints of the disazo-dyestuffs produced from these components in substance:

| Coupling component: | Tint |
|---|---|
| 1-acetoacetylamino-2-methylbenzene | Greenish yellow. |
| 1-acetoacetylamino-4-methylbenzene | Do. |
| 1-acetoacetylamino-2-ethylbenzene | Do. |
| 1-acetoacetylamino-2-chlorobenzene | Do. |
| 1-acetoacetylamino-4-chlorobenzene | Do. |
| 1-acetoacetylamino-2-methoxybenzene | Do. |
| 1-acetoacetylamino-4-methoxybenzene | Yellow. |
| 1-acetoacetylamino-4-ethoxybenzene | Do. |
| 1-acetoacetylamino-2,4-dimethoxybenzene | Do. |
| 1-acetoacetylamino-2-methyl-3-chlorobenzene | Greenish yellow. |
| 1-acetoacetylamino-2,4-dimethoxy-5-chlorobenzene | Yellow. |
| 1-acetoacetylamino-2-methyl-4-chlorobenzene | Greenish yellow. |
| 1-acetoacetylamino-4-acetylaminobenzene | Yellow. |
| 1-acetoacetylamino-2-methyl-4-acetylaminobenzene | Do. |
| 1-acetoacetylamino-2-methoxy-5-acetylaminobenzene | Do. |
| 1-acetoacetylamino-2-methoxy-5-chloro-4-acetylaminobenzene | Reddish yellow. |

I claim:
1. The water-insoluble disazo-dyestuffs having the formula

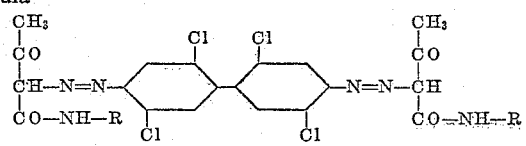

wherein R is a member selected from the group consisting of chlorophenyl, methylphenyl, ethylphenyl, methoxyphenyl, ethoxyphenyl, 2-methyl-3-chlorophenyl, 2-methyl-4-chlorophenyl, 2.4-dimethoxyphenyl, 2.4-dimethoxy-5-chlorophenyl, 2.5-dimethoxy-4-chlorophenyl, acetylaminophenyl, 4-acetylamino-2-methylphenyl, 5-acetylamino-2-methoxyphenyl and 4-acetylamino-2-methoxy-5-chlorophenyl.

2. The dyestuff corresponding to the following formula:

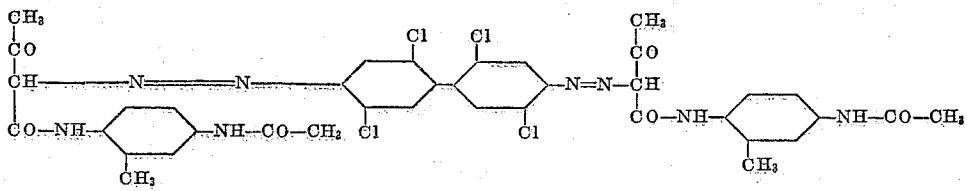

3. The dyestuff corresponding to the following formula:

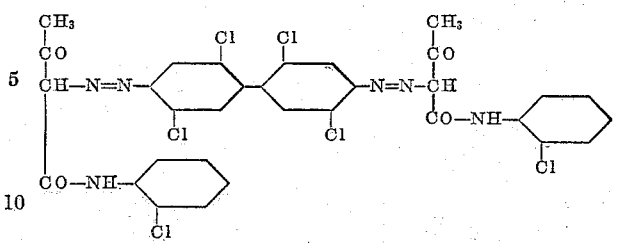

4. The dyestuff corresponding to the following formula:

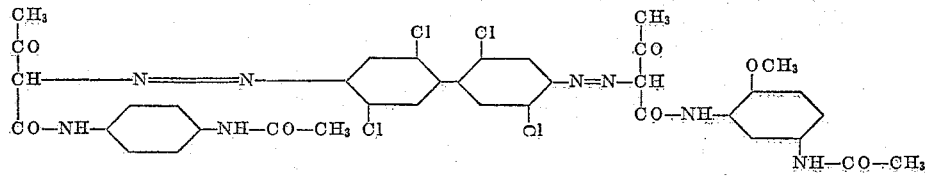

5. The dyestuff corresponding to the following formula:

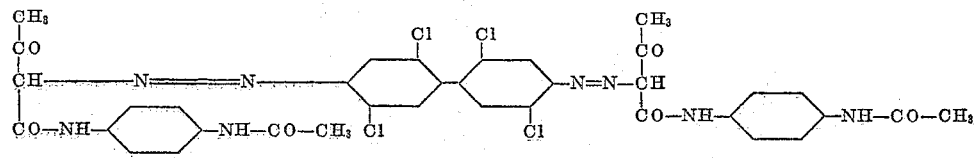

6. The dyestuff having the formula

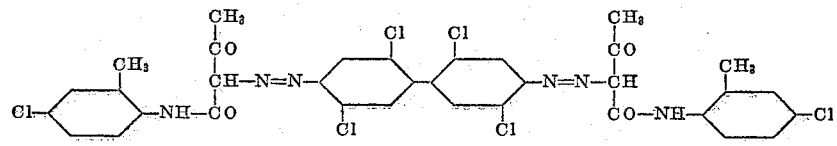

References Cited in the file of this patent
UNITED STATES PATENTS

| | | |
|---|---|---|
| 1,932,577 | Eichwede | Oct. 31, 1933 |
| 2,361,566 | Reynolds | Oct. 31, 1944 |
| 2,361,567 | Reynolds | Oct. 31, 1944 |
| 2,361,568 | Reynolds | Oct. 31, 1944 |
| 2,361,569 | Reynolds | Oct. 31, 1944 |
| 2,657,204 | De Lucia et al. | Oct. 27, 1953 |
| 2,807,609 | Danuser et al. | Sept. 24, 1957 |
| 2,880,177 | Lyons et al. | Mar. 31, 1959 |
| 2,936,306 | Schmid et al. | May 10, 1960 |